United States Patent [19]

Foussard

[11] Patent Number: 4,671,921
[45] Date of Patent: Jun. 9, 1987

[54] PROCESS, INSTALLATION AND DEVICE FOR COMPACTING OBLONG OBJECTS

[75] Inventor: Jean-François J. A. Foussard, Ezanville, France

[73] Assignee: Société pour les Transports de l'Industrie Nucléaire Transnucleaire, Paris, France

[21] Appl. No.: 576,383
[22] PCT Filed: Jun. 6, 1983
[86] PCT No.: PCT/FR83/00110
§ 371 Date: Jan. 19, 1984
§ 102(e) Date: Jan. 19, 1984
[87] PCT Pub. No.: WO83/04454
PCT Pub. Date: Dec. 22, 1983

[30] Foreign Application Priority Data

Jun. 7, 1982 [FR] France ................ 82 09859

[51] Int. Cl.⁴ .................................. G21C 19/32
[52] U.S. Cl. .......................... 376/261; 376/272; 29/723; 414/146
[58] Field of Search ................ 376/260–262, 376/264, 268–272, 463; 29/400 N, 723, 426.2, 426.3; 414/146; 53/530, 439; 100/152, 156

[56] References Cited

U.S. PATENT DOCUMENTS

| | | | |
|---|---|---|---|
| 4,158,601 | 6/1979 | Gerkey | 376/261 X |
| 4,441,242 | 4/1984 | Hicken et al. | 376/261 X |
| 4,446,098 | 5/1984 | Pomaibo et al. | 376/261 |
| 4,511,499 | 4/1985 | Meuschke et al. | 376/261 X |
| 4,537,741 | 8/1985 | Christiansen et al. | 376/261 |
| 4,548,347 | 10/1985 | Christiansen et al. | 376/261 |

FOREIGN PATENT DOCUMENTS

| | | | |
|---|---|---|---|
| 0066695 | 12/1982 | European Pat. Off. | |
| 2900865 | 7/1979 | Fed. Rep. of Germany | 376/261 |
| 78579 | 4/1978 | Luxembourg | |

Primary Examiner—Deborah L. Kyle
Assistant Examiner—Dan Wasil
Attorney, Agent, or Firm—Fisher, Christen & Sabol

[57] ABSTRACT

Method intended to form a more or less compact bundle of flexible and oblong objects of reduced cross-section dimensions, such as fuel rods of a nuclear reactor, said objects forming, prior to compacting, an assembly wherein they occupy transversally spaced, parallel positions. According to the invention, this method is characterized in that there is arranged, in a generally vertical direction, a plurality of guiding tubes (2) of which the upper ends (2a) are arranged according to the initial disposition of said object assembly, and of which the lower ends (2b) are arranged according to the desired disposition, the dimension of said guiding tubes (2) being such that in each of them one of said objects may slide by means of gravity, and in that said assembly of objects is brought vertically on top of the plurality of guiding tubes, whereafter each object is introduced by its lower end in the upper end of one of said guiding tubes (2), allowing the assembly of said objects to slide downwardly.

2 Claims, 9 Drawing Figures

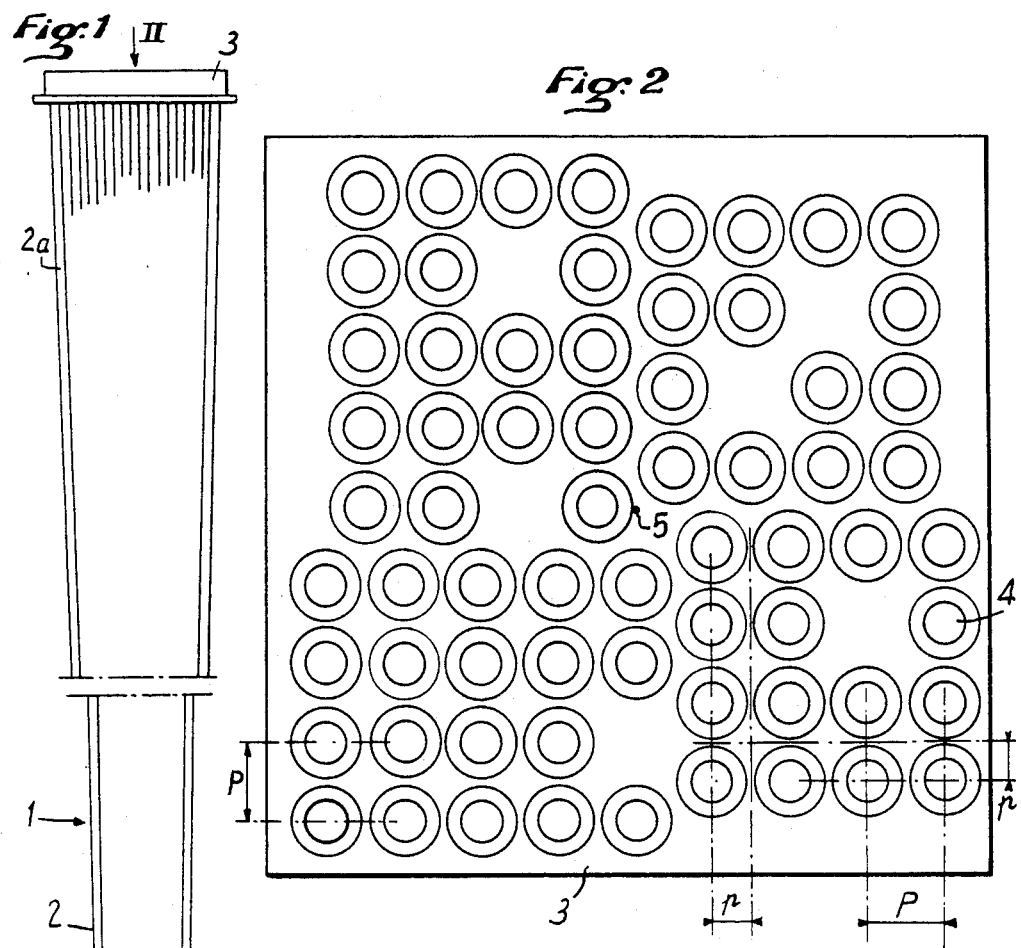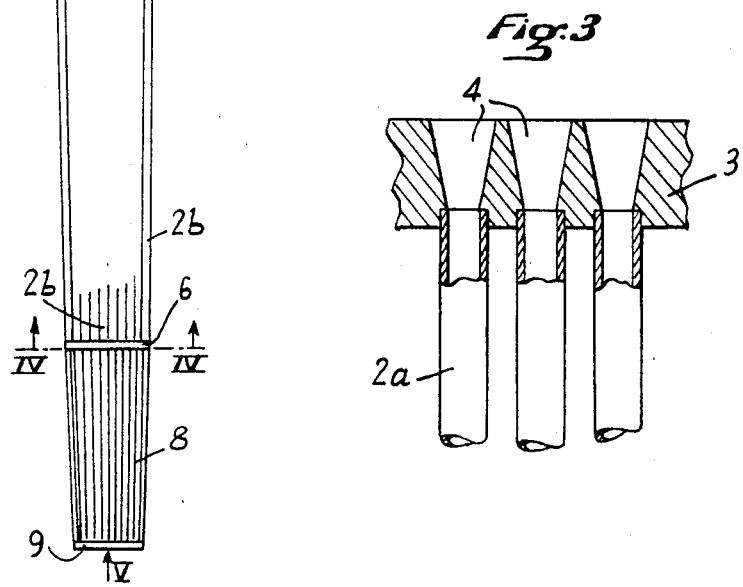

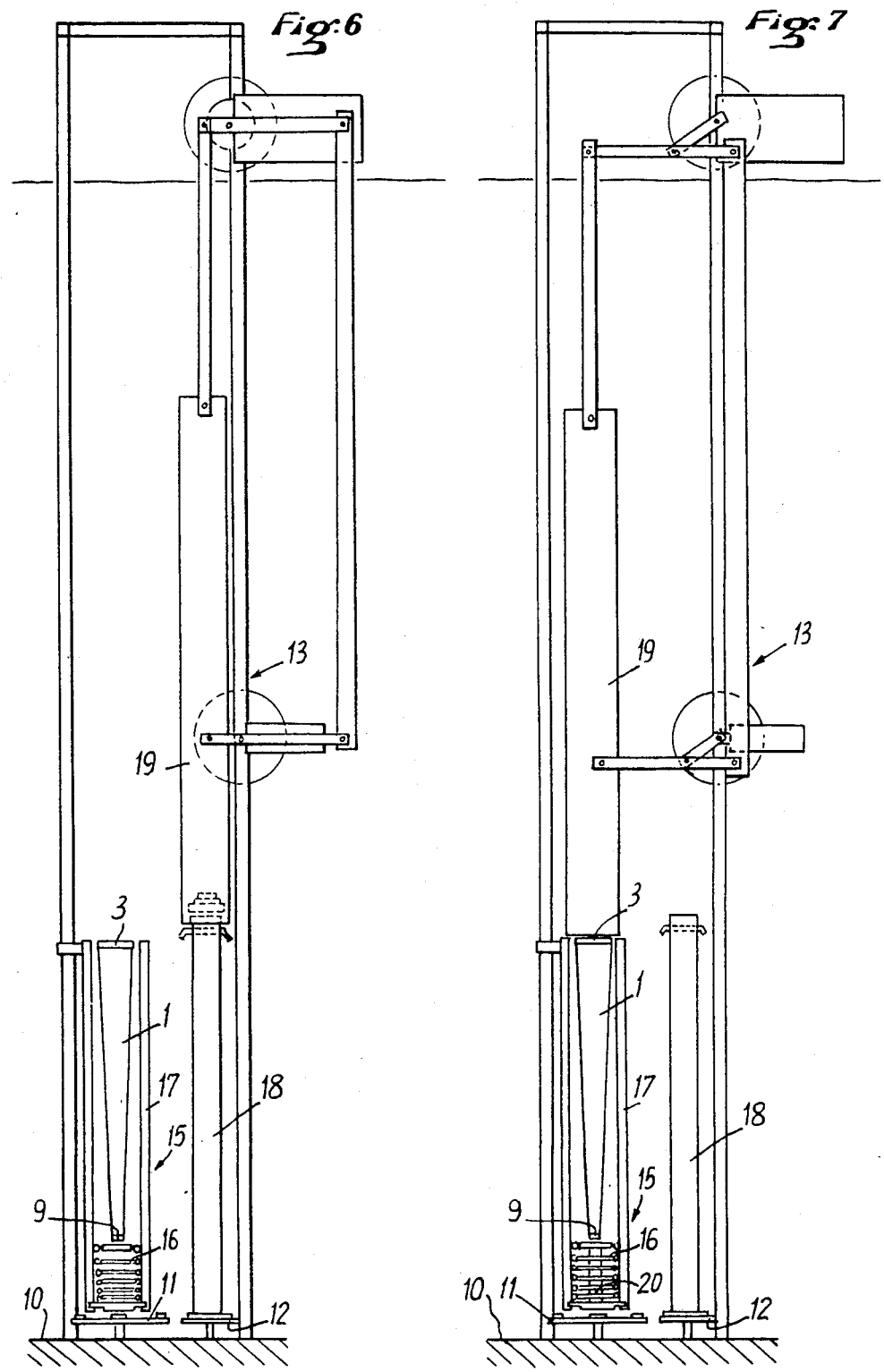

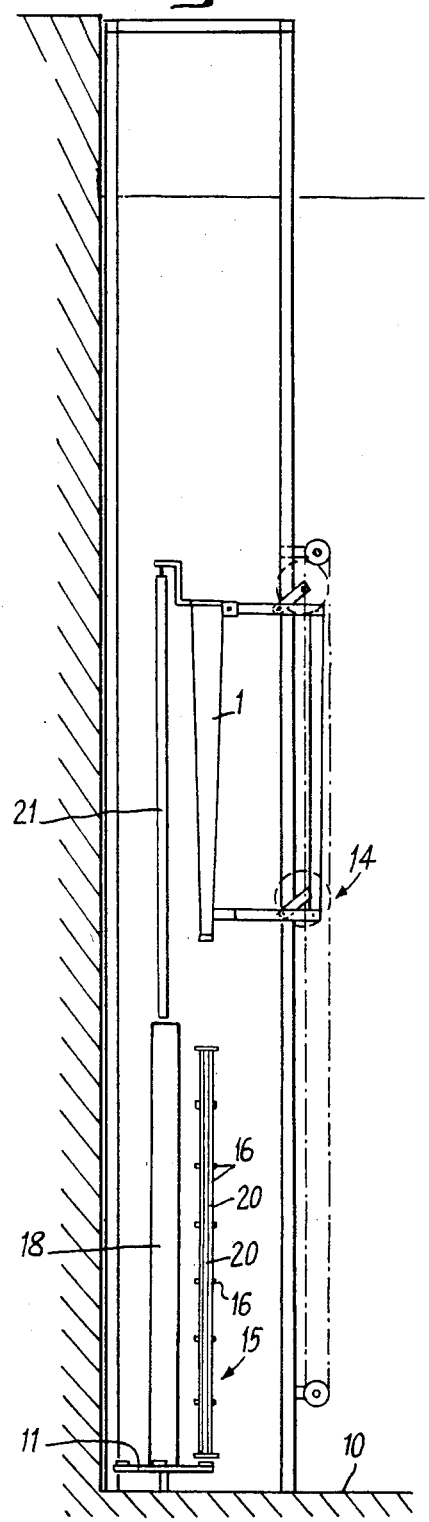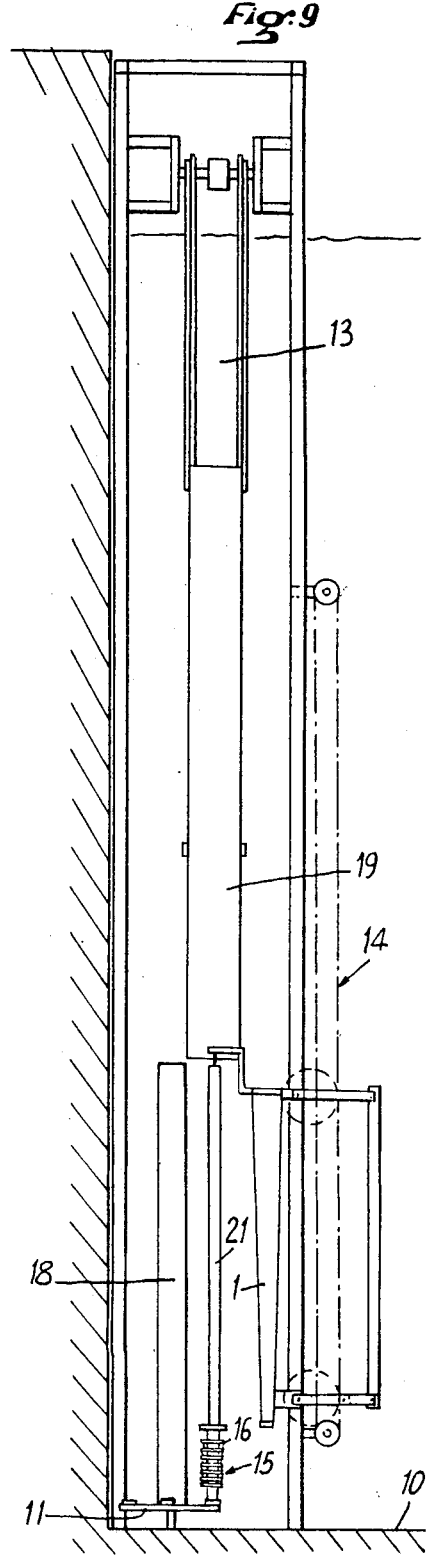

PROCESS, INSTALLATION AND DEVICE FOR COMPACTING OBLONG OBJECTS

The present invention relates to a process, installation and device for compacting flexible, oblong objects, particularly fuel pencils of a nuclear reactor.

In enriched uranium nuclear reactors, the fissile matter is known to be constituted by pellets of uranium oxide stacked in metal cans closed at each end to form what is called "fuel pencils". These are assembled together in large numbers (for example 264), with a certain number of tubes not containing fuel, to form a fuel element. The fuel elements are disposed in the reactor to form the core thereof.

Once the required specific burn-up is attained, the irradiated fuel elements are withdrawn from the reactor and immersed for several months in a nearby pond in order to cool and lose the major part of their radioactivity. They are then evacuated to an appropriate site and stored in some manner (pond, storage packaging, etc...) whilst awaiting possible re-processing.

Both for transport and storage, in order to save space, it is advantageous to dismantle the fuel elements and to re-assemble the fuel pencils compactly in bundles, i.e. in a more or less compact assembly of oblong, rectilinear objects which are parallel to one another over their whole length. In fact, inside a fuel element, the fuel pencils, which have an outer diameter of the order of 9.5 mm for example, are disposed in a lattice of square meshes whose sides are of the order of 12.6 mm. This results in a section of the fuel element virtually double that corresponding to a compact lattice.

It will be readily appreciated that dismantling of the fuel elements, and more particularly the constitution of bundles of pencils and introduction thereof into appropriate containers, presents difficulties since these pencils are very long (about 4 m) with respect to their small diameter (9.5 mm).

To overcome this difficulty, a method which may be envisaged at the present time would consist in taking the pencils from inside a fuel element row by row (17 pencils at a time, for example) and in disposing these pencils horizontally on vibrating tables which form a V surface an d which compact the pencils in the point of the V. The bundle of triangular section thus obtained is then pushed into a container, likewise of triangular section. The main disadvantages of such a method, apart from requiring a complex and expensive installation, are that it is slow (only 17 pencils out of the 264 contained in a fuel element are taken at a time) and that one can be sure only after vibration that the pencils will be absolutely parallel to one another. In fact, by reason of their great length, and therefore of their considerable longitudinal flexibility, adjacent pencils may interlace with one another to such an extent that they cannot be returned parallel to one another by vibration. In such a case, the bundle could not penetrate in the triangular container.

It is an object of the present invention to overcome all the drawbacks mentioned above. It relates to a process, installation and device for compacting objects of great length and of small transverse dimensions, with a view to disposing them in a container reliably, repetitively and rapidly, with the result that the portion of the section of the latter occupied by the transverse sections of said objects is maximum. It is applied more particularly, but not exclusively, to the handling and compacting of fuel pencils with a view to placing them in containers, whatever the purpose of such an operation (final storage, intermediate storage, transport, etc...).

To this end, according to the invention, the process for forming a bundle, i.e. an assembly of oblong, approximately rectilinear objects converging at one end, more or less compact, of oblong objects of small transverse dimensions, such as fuel pencils for nuclear reactors, said objects constituting, prior to the change of arrangement, an assembly in which they occupy parallel, transversely spaced apart positions, is noteworthy in that:

a plurality of guiding tubes are arranged substantially parallel to the same direction, of which, on one side, the ends are disposed in register with the initial arrangement of said assembly of objects and of which, on the other side, the ends are disposed in register with the desired arrangement, the dimensions of said guiding tubes being such that one of said objects may freely slide, in view of its flexibility, in each of them, each object is introduced by one of its ends in the end disposed on the first side of one of said tubes, and all of said objects are allowed to slide simultaneously towards the ends disposed on the second side of said tubes.

Although said tubes may be arranged in any general direction desired, it is advantageous, to utilize gravity, if this direction is substantially vertical. In this case, the upper ends of the guiding tubes are disposed in register with the initial arrangement of said assembly of objects and the lower ends of said tubes are disposed in the desired arrangement; said assembly is brought vertically above the plurality of the guiding tubes and, after introduction of said objects in said tubes, said objects are allowed to slide downwardly under the action of gravity. In this way, at the outlet of the plurality of tubes, i.e. in their lower part, the desired arrangement of the objects is obtained, which may be either more compact or less compact than the initial arrangement of said objects.

In the case of compacting, for a minimum diameter of the guiding tubes compatible with a good slide of the oblong objects, the degree of compacting of the objects, obtained at the outlet of the plurality of tubes, depends on the arrangement and the thickness of wall of said tubes in their lower part.

If it is desired to obtain an arrangement of the oblong objects in a compact bundle, according to the invention, the plurality of guiding tubes is given the closest possible disposition in their lower part and, downstream,is arranged a plurality of elongated rigid guiding elements of which the ends directed towards the guiding tubes are opposite the interstices between the closely located ends and of which the opposite ends are housed in the interstices left free between said objects, when the latter are in contact with one another. Each of said guiding elements may be constituted by a wire, the assembly of the wires forming a sort of convergent cage. In a variant, said elements may be formed by a thick plate or a multitude of superposed plates in which are formed guiding holes, the matter remaining between said holes constituting said guiding elements. In this way, said guiding elements make it possible transversely to compact the objects to a maximum.

When the number of the objects to be compacted is very high, operation can be carried out in several stages. In this case, for the sub-assembly of the objects compacted simultaneously and therefore for the ends for introduction of the guiding tubes, an arrangement is chosen such that, by a few simple relative movements (translation, rotation, etc...) it covers without omission (and possibly without duplication) the arrangement of all the said objects. Such an arrangement may be determined, inter alia, by the conditions of size of the means for gripping the objects. For example, from a fuel element with 264 pencils, four bundles each of 66 pencils may be formed.

To carry out the process according to the invention, it is advantageous to provide a compacting device comprising a plurality of guiding tubes of which, on one side, the ends are disposed in register with the initial arrangement of the assembly of objects to be compacted and, on the other side, the ends are disposed in the desired arrangement, the dimensions of said guiding tubes being such that one of said objects. may slide freely in each of them. On both sides, the tubes are preferably rendered fast with one another via transverse flanges pierced with holes disposed respectively in register with the dispositions retained for the ends of the tubes. Downstream, on the narrower side, said compacting device is extended by a plurality of rigid guiding elements fast with the corresponding flange and disposed so as to be housed, on the flange side, in the interstices between the ends of the guiding tubes and, on the side opposite the flange, in the interstices left free between said objects assembled in a bundle.

If said elements are wires, at their end opposite the flange, the peripheral wires are rendered fast with a closed bearing surface reproducing the contour of the cross section of the bundle at the most compact point.

If, moreover, it is desired to introduce the bundle of objects in a container, this container may be disposed in line with the plurality of the tubes and guiding elements, downstream thereof, then the objects may be slid inside said container. However, this manner of proceeding presents the drawback of necessitating considerable longitudinal dimensions, since, at one stage, the objects are in line with the plurality of guiding tubes and elements which themselves are in line with the container. In certain applications, particularly when fuel pencils are placed in containers vertically in a cooling and deactivation pond, it is impossible to operate in this way, since, in that case, the fuel pencils would at one time be located very close to the surface of the water of the pond. In such a case, according to a variant of the present invention, there is disposed, downstream of the plurality of the guiding elements and in line therewith, a device for provisionally accommodating the oblong objects, this device being extensible, retractable and adapted to maintain said objects in a bundle, the bundle of objects is transferred from the plurality of guiding tubes to the provisional receiving device, by moving said plurality of guiding tubes away and by progressively extending said provisional receiving device towards the guiding tubes, and the bundle of objects is then transferred from the provisional receiving device to the container by pushing the latter coaxially to said bundle, whilst progressively retracting said provisional receiving device.

In this way, an advantageous installation for carrying out the process according to the invention comprises a plurality of guiding tubes, disposed in a general vertical direction, of which the upper ends are disposed in register with the initial disposition of said assembly of objects and of which the lower ends are disposed in the desired arrangement, the dimensions of said guidin tubes being such that one of said objects may slide freely in each of them under the action of gravity.

If, moreover, the installaticn is provided for taking from a first container an assembly of objects occupying parallel, transversely spaced apart positions, and for placing in a second container the more or less compact bundle obtained from said assembly, it comprises gripping and handling means for hoisting out of the first container, disposed vertically, said assembly of objects, then for introducing the lower ends of said objects in the upper ends of said plurality 0 of guiding tubes, as well as means for transferring said bundle of objects from the plurality of tubes to the second container.

The invention will be more readily understood on reading the following description with reference 15 to the accompanying drawings, in which:

FIG. 1 shows in elevation a device for compacting elongated objects according to the invention.

FIG. 2 is a plan view in the direction of arrow II, of the upper flange of the device of FIG. 1.

FIG. 3 is a partial section through the upper flange of FIG. 1.

FIGS. 6 to 9 illustrate the carrying out of the invention for compacting the fuel pencils of a nuclear reactor.

Figure 4:
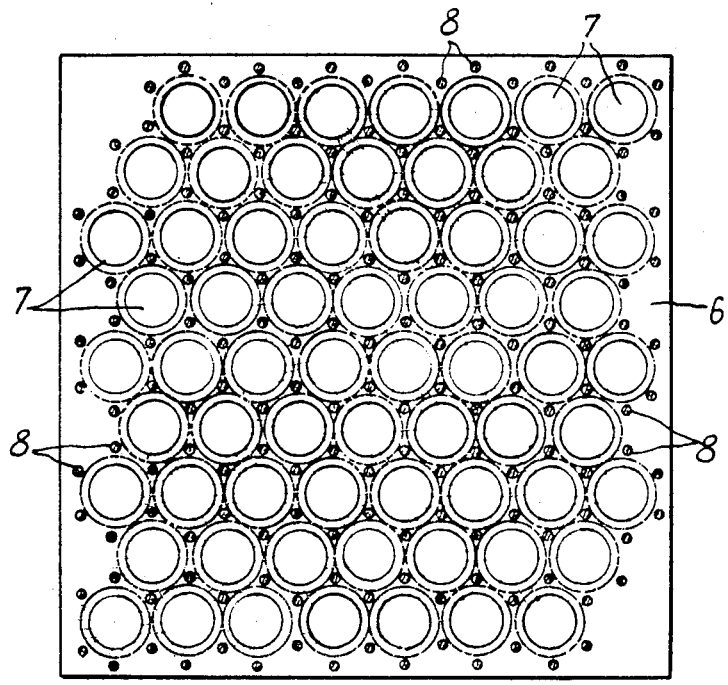
FIG. 4 is a section along line IV—IV of FIG. 1.
Figure 5:
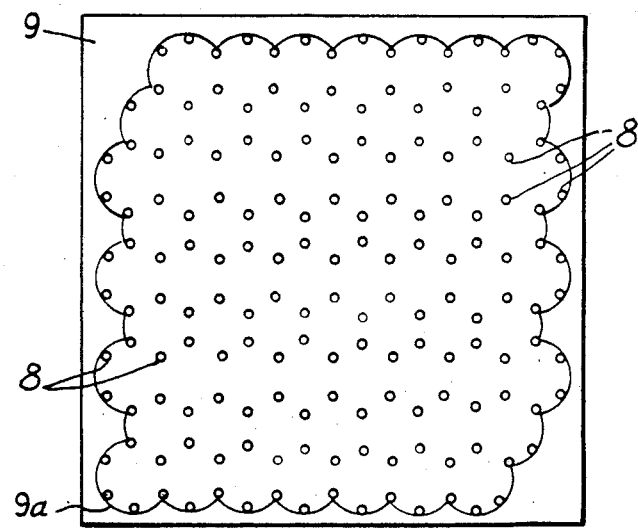
FIG. 5 is an end view in the direction of arrow V in FIG. 1.

Referring now to the drawings, the references used in FIGS. 1 to 9 (from 1 to 21) all have the same meaning. These Figures illustrate the invention with the aid of a particular embodiment intended for compacting 264 pencils of a conventional fuel element for nuclear reactor. In this fuel element, the pencils are distributed in a lattice of 17 lines and 17 columns, with square mesh of side (or pitch) equal to p = 12.6 mm. In addition to the 264 pencils, the lattice comprises 25 tubes without fuel forming the skeleton of the fuel element $(17 \times 17 = 264 + 25)$.

As shown in FIG. 1, the compacting device 1 according to the invention comprises a plurality of tubes (for example 66) spaced apart from one another at their upper ends and in contact with one another at their lower ends.

The upper ends 2a of the tubes are rendered fast with the lower face of a thick plate or flange 3 whose surface is substantialy equal to the section of a fuel element, in which through holes 4, widening outwardly, i.e. on the side opposite the tubes 2 (cf. FIGS. 2 and 3), are pierced. There are as many holes 4 as tubes 2 and each of them is disposed in line with the corresponding hole, so that said hole extends the interior of the tube. In the flange 3, the 66 holes 4 are centred at points corresponding to positions of pencils in the lattice of 264 pencils of the fuel element, but the distance separating the centres of two adjacent holes 4 is at least equal to P = 2p. In this way, there is more space available for gripping said pencils. Moreover, the relative arrangement of the 66 holes 4 in the flange 3 is such that, if the flange 3 is rotated through four successive quarter turns around its centre 5, the 66 holes 4 would occupy the 264 locations of the pencils of the fuel element. In this way, by taking from the fuel element the pencils according to the distribution of the holes 4 of the flange 3 and by rotating said fuel element about its longitudinal axis between each taking, all the 264 pencils are taken in four takings, and, at each taking, the pencils taken out of the fuel element may be introduced into holes 4 without difficulty, since they present the same relative arrangement.

The lower ends 2b of the tubes 2 are rendered fast with the upper face of a plate or flange 6, in which holes 7 are pierced. There are as many holes 7 as tubes 2 and each of them is extended by one of said holes. As shown in FIG. 4, each hole 7 (except on the edges) is surrounded by six holes 7 which are adjacent thereto. The tubes 2 thus pass from a spaced apart disposition with square mesh (at flange 3 level) to a close disposition with hexagonal mesh (at flange 6 level).

Moreover, rigid wires 8 are fixed to the lower face of the flange 6, in the interstices between the ends 2b of the tubes 2, to extend said tubes as immaterially as possible by converging them towards one another until the outer contour of each of the fuel pencils is defined. At their ends opposite the flange 6, the wires 8 are protected by a plate 9 (cf. FIG. 5) inside which is made a cut-out 9a corresponding to the section of a compact bundle of 66 pencils. The ends of the peripheral wires 8 are rendered fast with the plate 9, the others being located inside the cut-out 9a.

In this way, it will be readily understood that 66 pencils introduced simultaneously in the holes 4 of the flange 3 are guided by the tubes 2, the holes 7 then the wires 8 and the plate 9 to form a bundle which presents at the most compact location a section such that it can be introduced into a container of minimum section.

Of course, the degree of compacting obtained downstream of flange 6 depends on the outer diameter, therefore on the wall thickness, of the tubes 2 at their lower end 2b. The rigid wires complete compacting.

The gradient of compacting, and therefore the length of the tubes 2, depend on the flexibility of the pencils and on the clearance between the inner diameter of the tubes 2 and the pencils. Experience has shown that, for conventional pencils of 4 m in length and 9.5 mm in diameter, tubes with a length of 2.5 to 3 m and 10.5 mm in inner diameter extended by wires of about 0.5 mm in length gave good results.

FIGS. 6 to 9 schematically illustrate an application of the process according to the invention. FIGS. 8 and 9 show a view at 90° with respect to that of FIGS. 6 and 7.

On the bottom 10 of a cooling and deactivation pond are disposed horizontal support plates 11 and adapted to rotate about their vertical axis, and handling mechanisms 13 and 14.

Plumb with the compacting device 1 is mounted an intermediate reception device 15 inside which the device 1, displaced by the mechanism 14 (shown in FIGS. 8 and 9) may penetrate. This intermediate reception device 15 comprises a plurality of plates parallel to one another and identical to plate of the device 1. The different plates 16 may move vertically, whilst remaining horizontal, along vertical rails 17. In the position shown in FIGS. 6 and 7, the compacting device 1 is located between the rails and the plates 16 are in their low position.

Furthermore, a fuel element 18 is vertically centred on the rotating plate 12. The mechanism 13 (shown in FIGS. 6 and 7) enables a device 19 for extracting the pencils 20 from the fuel element 18, to be manoeuvred.

The device 19 is guided by mechanism 13 above the element 18 and takes therefrom 66 pencils distributed as shown in FIG. 2 (cf. FIG. 6). The mechanism 13 then displaces the device 19 to guide it plumb with device 1. The 66 pencils descend vertically and, after having passed through device 1 by the action of gravity, they are compacted and released. The bundle of pencils 20 on leaving the device 1 passes through the different assembled plates 16 (cf. FIG. 7). The mechanism 14 is then actuated to raise the device 1 in order to remove it from the rails 17, whilst the plates 16 are also manoeuvred so that, sliding upwardly, they move away from one another. In this way, the device 1 releases the pencils 20 which are, however, maintained compacted by the spaced apart plates 16 (cf. FIG. 8). Finally, the mechanism 14 brings plumb with the bundle of pencils contained in the intermediate reception device 15, a container 21 which is lowered so that the compacted pencils 20 pass in said container 21 (cf. FIG. 9).

After these operations, a quarter of the pencils contained in the fuel element 18 has therefore been placed in a container. By recommencing the operation four times after rotation of plates 11 and 12 (plate 11 bearing three other containers 21—not shown in the Figures), all the pencils of element 18 are placed in a container.

I claim:

1. Process for compacting a bundle of fuel pencils for nuclear reactors, comprising:
   (a) arranging a plurality of guiding tubes substantially parallel to the same general vertical direction, of which tubes, on one side, the upper ends are disposed in register with the initial arrangement of said bundle of fuel pencils and of which, on the other side, the ends lower are disposed in accordance with a desired compacted arrangement, the internal dimensions of said guiding tubes being such that one of said fuel pencils can freely slide in each of them;
   (b) disposing said bundle of fuel pencils above the plurality of guiding tubes;
   (c) introducing one end of each fuel pencil into one of the upper ends of said guiding tubes;
   (d) allowing all of said fuel pencils to slide towards the lower ends of said guiding tubes; and
   (e) arranging, downstream of the guiding tubes, a plurality of convergent, rigid linear guiding elements for said fuel pencils whose ends directed towards the guiding tubes are in register with the interstices between the ends of said guiding tubes and whose opposite ends are disposed in the interstices left free between said fuel pencils when the latter are in the compacted arrangement;
   (f) introducing the compacted bundle of fuel pencils in a receiving container whose transverse section is slightly larger than the smallest transverse section of said compacted bundle, wherein:
      downstream of the plurality of convergent, rigid linear guiding elements and in line therewith, there is disposed a device for tempoarily receiving said fuel pencils, this device being extensible, retractable and adapted to maintain said fuel pencils in a compacted bundle,
      the plurality of fuel pencils is progressively transferred from the plurality of guiding tubes to the receiving container by raising said plurality of guiding tubes, while progressively extending said temporary receiving device,
      and the bundle of fuel pencils is then transferred from the temporary receiving device to the receiving container by pushing the latter coaxially to said bundle while progressively retracting said temporary receiving device.

2. Compacting device for compacting a bundle of fuel pencils for a nuclear reactor, said fuel pencils constituting, prior to compacting, an assembly in which they occupy parallel, transversely spaced apart positions, wherein said device comprises a pluralityof vertical guiding tubes of which, on one side, the ends upper are disposed in register with the initial arrangement of the assembly of fuel pencils to be compacted and, on the other side, the lower ends are disposed in the desired arrangement, the internal dimensions of said guiding tubes being such that one of said fuel pencils may slide in each of them and a plurality of convergent, rigid, linear guiding elements for said fuel pencils being beyond said plurality of vertical guiding tubes, said guiding elements being disposed so as, on the tube side, to be opposite the interstices between the ends thereof, and, on the opposite side, to be in the interstices left free between said fuel pencils assembled in a compacted bundle, and the guiding elements, at their end opposite the guiding tubes, reproducing the contour of the cross section of the compacted bundle of fuel pencils;

mechanical handling means for ensuring the relative diplacement of the fuel pencils with respect to said guiding tubes; and an extensible and retractable device adapted to maintain said assembly of fuel pencils in a compacted bundle, this device temporarily receiving said fuel pencils before they are introduced into a receiving container.

* * * * *